US012399954B2

(12) United States Patent
Urciuoli et al.

(10) Patent No.: US 12,399,954 B2
(45) Date of Patent: Aug. 26, 2025

(54) DATA LINEAGE METRIC BASED DATA PROCESSING

(71) Applicant: Capital One Services, LLC, McLean, VA (US)

(72) Inventors: Raymond Urciuoli, Orlando, FL (US); Niharendu Chandra, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/519,650

(22) Filed: Nov. 27, 2023

(65) Prior Publication Data
US 2025/0173400 A1    May 29, 2025

(51) Int. Cl.
*G06F 7/00* (2006.01)
*G06F 17/40* (2006.01)

(52) U.S. Cl.
CPC ................... *G06F 17/40* (2013.01)

(58) Field of Classification Search
CPC .... G06F 17/40; G06F 16/1873; G06F 16/219; G06F 16/2329
See application file for complete search history.

(56) References Cited

U.S. PATENT DOCUMENTS

| | | | | |
|---|---|---|---|---|
| 6,343,295 | B1 * | 1/2002 | MacLeod | G06F 16/219 707/999.102 |
| 8,706,537 | B1 * | 4/2014 | Young | G16H 50/30 705/7.11 |
| 8,819,010 | B2 * | 8/2014 | Fankhauser | G06Q 10/10 707/802 |
| 10,025,878 | B1 * | 7/2018 | Lefever | G06F 16/9024 |
| 11,755,536 | B1 * | 9/2023 | Pushkin | G06F 16/219 707/803 |
| 2013/0080197 | A1 * | 3/2013 | Kung | G06Q 10/10 707/E17.084 |
| 2013/0332423 | A1 * | 12/2013 | Puri | G06F 16/35 707/687 |
| 2014/0114907 | A1 * | 4/2014 | Kozina | G06F 16/219 707/602 |
| 2014/0279934 | A1 * | 9/2014 | Li | G06F 16/215 707/687 |
| 2015/0012478 | A1 * | 1/2015 | Mohammad | G06F 16/254 707/602 |
| 2015/0058278 | A1 * | 2/2015 | Fankhauser | G06F 16/2365 707/602 |

(Continued)

*Primary Examiner* — Mohammed R Uddin
(74) *Attorney, Agent, or Firm* — Harrity & Harrity, LLP (57) ABSTRACT

In some implementations, a device may receive, by device, information identifying a data lineage for a plurality of datasets, the data lineage including, for a dataset of the plurality of datasets, information identifying one or more hops associated with the dataset, each hop, of the one or more hops, corresponding to a transformation of the dataset corresponding to a data processing process. The device may generate a plurality of data lineage metrics for a plurality of hops associated with a plurality of data processing processes to which the plurality of datasets is subjected in association with the data lineage. The device may generate an overall data lineage metric based on the plurality of data lineage metrics, the overall data lineage metric having a plurality of components. The device may transmit an output associated with the overall data lineage metric.

20 Claims, 8 Drawing Sheets

(56) References Cited

U.S. PATENT DOCUMENTS

| | | | | |
|---|---|---|---|---|
| 2016/0019286 | A1* | 1/2016 | Bach | G06F 16/119 |
| | | | | 707/603 |
| 2016/0267082 | A1* | 9/2016 | Wong | G06F 16/164 |
| 2016/0359872 | A1* | 12/2016 | Yadav | H04L 63/1408 |
| 2017/0270022 | A1* | 9/2017 | Moresmau | G06F 11/302 |
| 2018/0060370 | A1* | 3/2018 | Eshwar | G06F 16/215 |
| 2018/0129699 | A1* | 5/2018 | Gould | G06F 16/288 |
| 2018/0217883 | A1* | 8/2018 | Murugan | G06F 9/5033 |
| 2020/0089485 | A1* | 3/2020 | Sobran | G06F 18/23213 |
| 2021/0216229 | A1* | 7/2021 | Bastide | G06F 16/24578 |
| 2021/0216521 | A1* | 7/2021 | Jia | G06F 16/367 |
| 2021/0286663 | A1* | 9/2021 | Thomas | G06F 11/076 |
| 2022/0269884 | A1* | 8/2022 | Walters | G06V 30/418 |
| 2022/0292070 | A1* | 9/2022 | Kinoshita | G06F 16/2386 |
| 2022/0398186 | A1* | 12/2022 | Mudumba | G06F 16/254 |
| 2023/0086750 | A1* | 3/2023 | Battistoni | G06F 11/328 |
| | | | | 707/694 |
| 2023/0289839 | A1* | 9/2023 | Narechania | G06Q 30/0201 |
| 2024/0362236 | A1* | 10/2024 | St. Martin | G06F 16/24578 |

* cited by examiner

DATA LINEAGE METRIC BASED DATA PROCESSING

BACKGROUND

Data lineage of data includes the data's origin, processing performed on the data, where the data moves, and/or the like. Data lineage provides the ability to trace errors associated with the data, to access past versions or inputs associated with the data (e.g., for reviewing and/or analyzing the data), among other actions. Data lineage can provide an audit trail of the data. In some examples, an organization may maintain data lineage information in a centralized system, such as an enterprise data management system, a metadata repository, or a similar system. Users changing data may post the data lineage information to the centralized system. Users accessing data may view the data lineage information in the centralized system, thereby accessing information associated with an evolution of the data over time.

SUMMARY

Some implementations described herein relate to a system for data processing. The system may include one or more memories and one or more processors communicatively coupled to the one or more memories. The one or more processors may be configured to receive information identifying a data lineage for a plurality of datasets, the data lineage including, for a dataset of the plurality of datasets, information identifying one or more hops associated with the dataset, each hop, of the one or more hops, corresponding to a transformation of the dataset corresponding to a data processing process. The one or more processors may be configured to generate a plurality of data lineage metrics for a plurality of hops associated with a plurality of data processing processes to which the plurality of datasets is subjected in association with the data lineage. The one or more processors may be configured to generate an overall data lineage metric based on the plurality of data lineage metrics, the overall data lineage metric having a plurality of components. The one or more processors may be configured to receive information identifying an event associated with the data lineage. The one or more processors may be configured to perform a processing action based on the event and the overall data lineage metric.

Some implementations described herein relate to a method. The method may include receiving, by device, information identifying a data lineage for a plurality of datasets, the data lineage including, for a dataset of the plurality of datasets, information identifying one or more hops associated with the dataset, each hop, of the one or more hops, corresponding to a transformation of the dataset in association with a data processing process. The method may include generating, by the device, a plurality of data lineage metrics for a plurality of hops associated with a plurality of data processing processes to which the plurality of datasets is subjected in association with the data lineage. The method may include generating, by the device, an overall data lineage metric based on the plurality of data lineage metrics, the overall data lineage metric having a plurality of components. The method may include transmitting, by the device, an output associated with the overall data lineage metric.

Some implementations described herein relate to a non-transitory computer-readable medium that stores a set of instructions. The set of instructions, when executed by one or more processors of a system, may cause the system to receive information identifying a data lineage for a plurality of datasets, the data lineage including, for a dataset of the plurality of datasets, information identifying one or more hops associated with the dataset, each hop, of the one or more hops, corresponding to a transformation of the dataset corresponding to a data processing process. The set of instructions, when executed by one or more processors of the system, may cause the system to generate a plurality of data lineage metrics for a plurality of hops associated with a plurality of data processing processes to which the plurality of datasets are subjected in association with the data lineage. The set of instructions, when executed by one or more processors of the system, may cause the system to generate an overall data lineage metric based on the plurality of data lineage metrics, the overall data lineage metric having a plurality of components. The set of instructions, when executed by one or more processors of the system, may cause the system to transmit one or more alerts associated with the overall data lineage metric.

DETAILED DESCRIPTION

The following detailed description of example implementations refers to the accompanying drawings. The same reference numbers in different drawings may identify the same or similar elements.

Vast amounts of data may be stored electronically in data structures (e.g., databases, blockchains, log files, cookies, or the like). A device may perform multiple queries, or other information retrieval techniques, to unrelated data structures to obtain data relevant to a particular task or computational operation. Moreover, each data structure may employ a particular schema and/or use particular data formatting conventions for data storage. Thus, the data may be incompatible and difficult to integrate into machine-usable outputs for computational instructions or automation. This incompatibility may necessitate separate handling of the data using complex instructions and/or repetitive processing to achieve desired computational outcomes or automation outcomes, thereby expending significant computing resources (e.g., processor resources and/or memory resources) and causing significant delays.

In addition, separate use of the data, such as individually presenting the data in a user interface for analysis by a user, may be inefficient. For example, a device may separately process and/or reformat data from different data structures to obtain information for presenting in the user interface, thereby expending significant computing resources. Furthermore, individually presenting the data may increase the size of a user interface (e.g., a web page) or utilize multiple user interfaces (e.g., multiple web pages). Navigating through a large user interface or a large number of user interfaces to find relevant information creates a poor user experience, consumes excessive computing resources that are needed for a client device to generate and display the user interface(s) and that are needed for one or more server devices to serve the user interface(s) to the client device, and consumes excessive network resources that are needed for communications between the client device and the server device.

Data lineage information may enable integration of otherwise incompatible data from multiple unrelated data structures. For example, a system may determine data lineage information based on data relating to a change in source code posted to a software development hosting system. Based on the data lineage information, the system may automatically update an enterprise data management system, a metadata repository, and/or a similar data management system. The system may be capable of generating a data lineage record that includes values that are unique to other records in the same data structure and/or records in another data structure of another system. In this way, the system facilitates source system and destination system mapping of data. Generating a data lineage for data structures enables an entity to manage a flow of information, ensure data quality, maintain compliance standards, or perform data governance operations, among other examples. However, a system may lack information for objectively determining a quality of a data lineage. Accordingly, determinations and processing actions that the system performs using the data lineage may be based on subjective determinations that can be error-prone and/or inefficient. As the amount of data that entities (and systems thereof) manage increases, inefficient and/or error-prone actions may result in wastage of large amounts of computing resources.

Some implementations described herein enable generation of data lineage metrics and performance of processing actions based on the data lineage metrics. For example, a dataset evaluation system may determine a data lineage, evaluate the data lineage to generate a set of metrics associated with the data lineage, combine the set of metrics into a single overall data lineage metric, and perform processing actions, in response to events, based on the single overall data lineage metric. In this way, the system and/or a machine learning model thereof enables efficient and/or error-free performance of operations based on otherwise incompatible data while conserving computing resources and reducing delays that would otherwise result from separate handling of the data using complex instructions, inefficient response actions, error-prone determinations, and/or repetitive processing. Moreover, an output of the system and/or a machine learning model thereof may convey data, such as a data lineage metric, relating to multiple unrelated databases in a smaller user interface or in a fewer number of user interfaces than otherwise would have been used to individually present data or metrics from the multiple unrelated databases. In this way, the use of computing resources and network resources is reduced in association with serving, generating, and/or displaying the user interface(s).

FIGS. 1A-1E are diagrams of an example implementation 100 associated with data lineage metric based data processing. As shown in FIGS. 1A-1E, example implementation 100 includes a dataset evaluation device 102, a client device 104, a compliance data structure 106, and a data structure 108. These devices are described in more detail below in connection with FIG. 2 and FIG. 3.

Figure 1A:
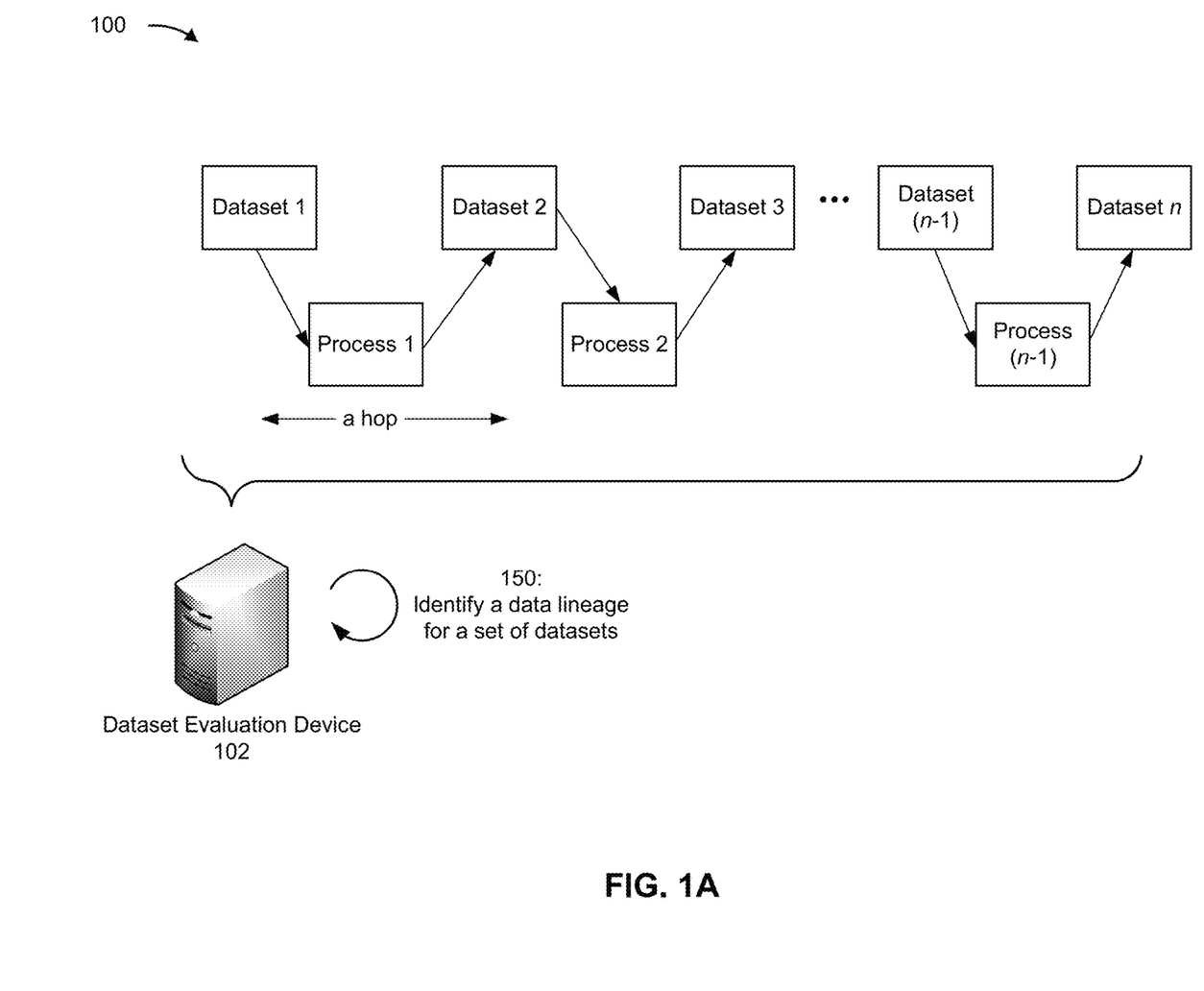
FIGS. 1A-1E are diagrams of an example implementation associated with data lineage metric based data processing, in accordance with some embodiments of the present disclosure.

As shown in FIG. 1A, and by reference number 150, the dataset evaluation device 102 may identify a data lineage for a set of datasets. For example, the dataset evaluation device 102 may identify a group of datasets and/or a group of processes performed on the group of datasets. A data lineage may include transformations or interactions with a dataset. Accordingly, a data lineage for a dataset 1, as shown, may include information indicating a set of hops, where each hop includes a process that interacts with (or transforms) the dataset. In this example, a hop includes the dataset 1 being input to the process 1 and the dataset 2 being output from the process 2. Similarly, another hop includes the dataset 2 being input to the process 2 and dataset 3 being output from the process 2. Similarly, another hop includes the dataset n-1 being input to the process n-1 and the dataset n being output from the process n-1. In other words, a hop may be associated with input of a dataset to a process and output of a dataset from a process corresponding to a transformation or use of the input of the dataset by the process.

In some implementations, the dataset evaluation device 102 may determine a hop based on a group of hop characteristics, such as an origin characteristic, a transformation characteristic, a relational characteristic, or a destination characteristic, among other examples. For example, the dataset evaluation device 102 may characterize a hop as being associated with a dataset originating in a source system that is an internal system or an external system (e.g., an internal system may indicate a greater degree of control over the dataset than an external system, which may correlate to a higher data lineage metric). Additionally, or alternatively, the dataset evaluation device 102 may characterize a hop as having the dataset undergo a particular type of transformation, such as undergoing extract, transport, and load (ETL) into a database or data warehouse. Additionally, or alternatively, the dataset evaluation device 102 may characterize a hop as having a set of dependencies for a dataset on one or more other datasets, resources, or systems. Additionally, or alternatively, the dataset evaluation device 102 may characterize a hop as having a particular destination, such as a data warehouse, a data dashboard, or a data report, among other examples.

In other examples, a process may receive multiple datasets as input, generate multiple datasets as output, use and output a dataset without changing the dataset, or perform another action in which a dataset is consumed by a process. In some implementations, the processes may be executed by internal systems or external systems. For example, as described in more detail below, a process may be performed by a system that is internal to an entity that is managing the data lineage or by a system that is external to the entity. In some examples, a difference between whether a system is internal or external may result in a different metric value for a data lineage and a different associated processing action (e.g., a different compliance action, as described in more detail below).

In some implementations, the dataset evaluation device 102 may receive information identifying a data lineage based on parsing program code or specifications associated with a set of processes. For example, the dataset evaluation device 102 may parse program code to determine a set of systems that generate data for the program code and a set of datasets from which the data is derived. In this case, the dataset evaluation device 102 may identify one or more inputs to the program code and/or one or more outputs of the program code and may correlate the one or more inputs to the one or more outputs. Based on correlating the one or more inputs to the one or more outputs, the dataset evaluation device 102 may identify one or more hops that represent transformations to the one or more inputs by the program code to generate the one or more outputs.

Additionally, or alternatively, the dataset evaluation device 102 may receive information identifying the data lineage from an enterprise system that stores a group of datasets. For example, when a dataset is retrieved from a server by a program or system, the server may store information indicating which program or system requested the data. Similarly, when a dataset is stored on a server, the server may store information indicating which program or system stored the data. Accordingly, the dataset evaluation device 102 may receive log data from the server and may parse the log data to determine a set of requests to retrieve or store data, from which the dataset evaluation device 102 may generate a data lineage for the data.

In some implementations, the data lineage may relate to multiple groups of datasets. For example, the data lineage may track a first dataset that undergoes a first one or more interactions with a first one or more processes, a second dataset that undergoes a second one or more interactions with a second one or more processes, or a third dataset that undergoes a third one or more interactions with a third one or more processes, among other examples. In this case, the dataset evaluation device 102 may generate data lineage information for tens, hundreds, thousands, or millions of datasets being input to, processed by, and/or output from tens, hundreds, thousands, or millions of processes across one or more entities. An entity may include a computing system (e.g., a cloud computing system), an organization controlling multiple computing systems, an industry, a geographic area, or another logical organization of control of data.

In some implementations, the dataset evaluation device 102 may update the data lineage. For example, when the dataset evaluation device 102 stores information identifying an existing data lineage and the dataset evaluation device 102 determines that a new dataset is associated with the data lineage, the dataset evaluation device 102 may add the new dataset to the data lineage. In this case, as described below, the dataset evaluation device 102 may recalculate an overall data lineage metric for the data lineage and transmit an output associated with the recalculated overall data lineage metric. Similarly, the dataset evaluation device 102 may receive information identifying a new processing process, such as new program code. In this case, the dataset evaluation device 102 may update the data lineage to add the new processing process and may recalculate the overall data lineage metric to include the new processing process.

Figure 1B:
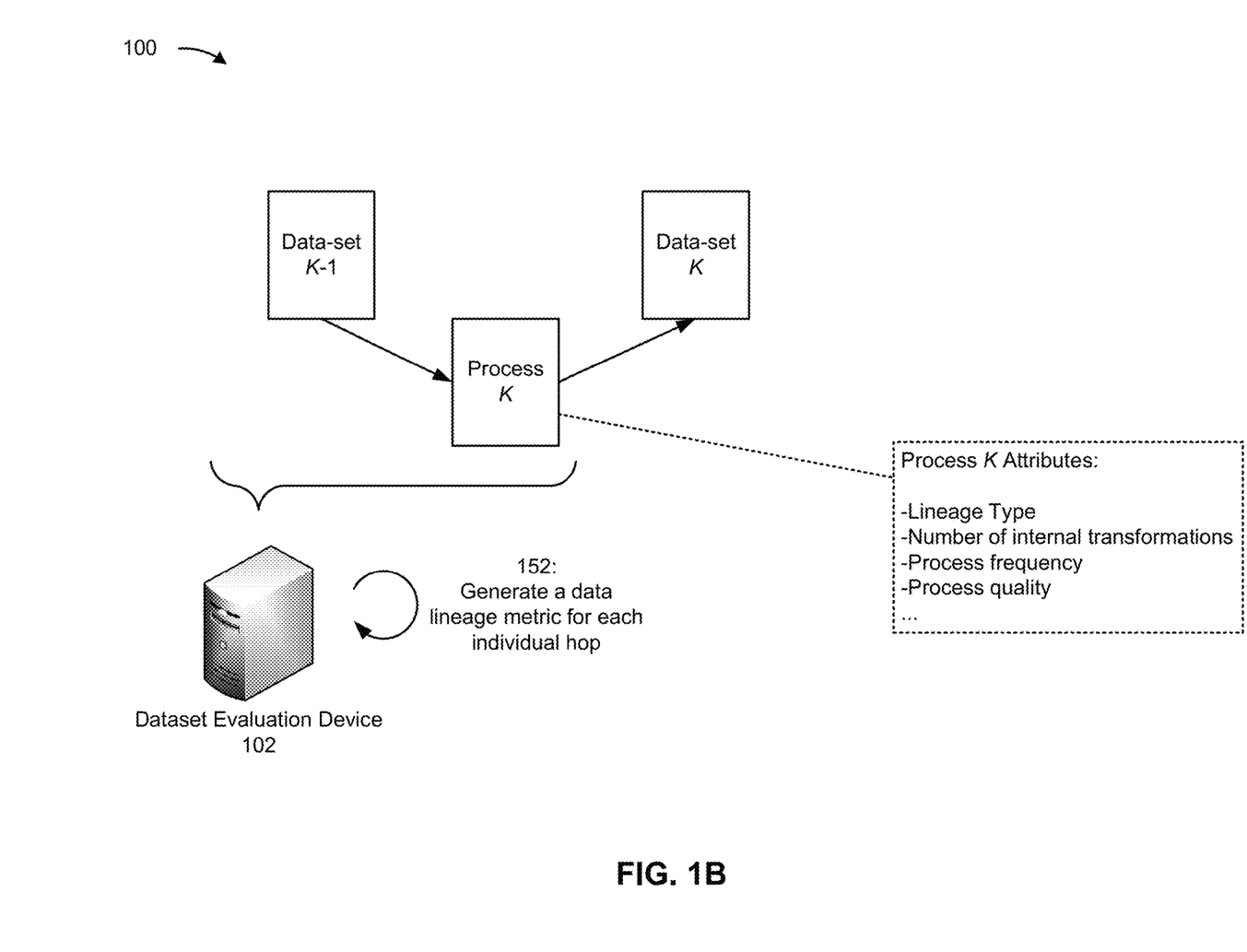

As shown in FIG. 1B, and by reference number 152, the dataset evaluation device 102 may generate a set of data lineage metrics. For example, the dataset evaluation device 102 may generate at least one data lineage metric for each individual hop of a data lineage. In this case, the dataset evaluation device 102 may generate multiple data lineage metrics for multiple hops associated with multiple processes to which multiple datasets are subjected.

In some implementations, the dataset evaluation device 102 may generate a particular type of data lineage metric. For example, the dataset evaluation device 102 may generate an accuracy metric (e.g., that indicates a score for how accurate data lineage is predicted to be for a hop), a resolution metric (e.g., that indicates a granularity with which the data lineage tracks data of a dataset, such as on a whole dataset basis or on a single data entry basis), a frequency metric (e.g., that indicates a frequency with which the hop is completed by a process or a frequency with which the data lineage is updated), or a completeness metric (e.g., that indicates a degree of completeness of the data lineage with respect to a particular hop).

In some implementations, the dataset evaluation device 102 may determine a data lineage metric based on one or more attributes. For example, the dataset evaluation device 102 may parse a hop of a data lineage (e.g., a particular process K that receives a dataset K-1 as input and generates a dataset K as output) to determine one or more attributes of the hop. Attributes may include a type of data lineage, a quantity of internal transformations that the process uses to generate dataset K from dataset K-1, a process frequency for process K (e.g., how often process K is executed), or a process quality for process K (e.g., a rate at which errors occur in process K), among other attributes.

Figure 1C:
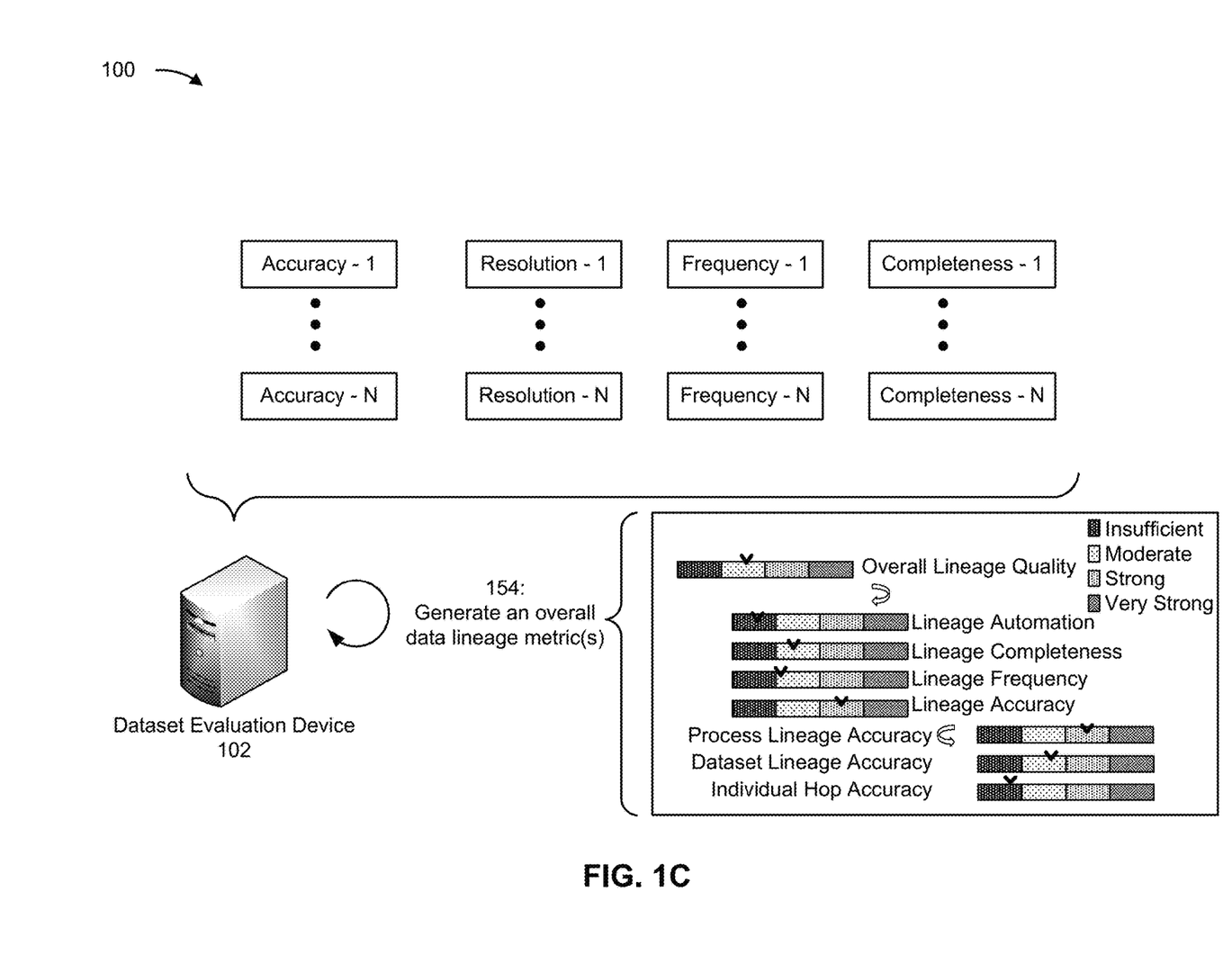

As shown in FIG. 1C, and by reference number 154, the dataset evaluation device 102 may generate one or more overall data lineage metrics. For example, the dataset evaluation device 102 may generate a single overall data lineage metric. Additionally, or alternatively, the dataset evaluation device 102 may generate multiple overall data lineage metrics for multiple characteristics of a data lineage. In some implementations, the dataset evaluation device 102 may apply weights to one or more metrics to generate an overall data lineage metric. For example, the dataset evaluation device 102 may apply weights to individual accuracy component data lineage metrics (e.g., Accuracy 1 through N) generated for each hop of a data lineage to determine an overall accuracy data lineage metric for the data lineage. Similarly, the dataset evaluation device 102 may apply weights to individual completeness metrics (e.g., Completeness 1 through N) generated for each hop of a data lineage to determine an overall completeness data lineage metric for the data lineage. Similarly, the dataset evaluation device 102 may apply weights to resolution metrics (e.g., Resolution 1 through N) or frequency metrics (e.g., Frequency 1 through N) In another example, the dataset evaluation device 102 may apply weights to different types of metrics to generate an overall data lineage metric. For example, the dataset evaluation device 102 may apply different weights to an overall accuracy component metric, an overall resolution component metric, an overall frequency component metric, or an overall completeness component metric to determine a single overall data lineage quality metric. As an example, the dataset evaluation device 102 may generate an overall accuracy component metric based on a set of individual hop quality metrics (e.g., which may be based on a quantity of attributes used in a transformation of a hop and a quantity of attributes in an input dataset of the hop), an overall hop quality (e.g., which may be based on a set of process hop weightings for each hop, a process lineage, and an effective process lineage), or an overall dataset lineage quality (e.g., which may be based on the individual hop qualities).

In some implementations, the dataset evaluation device 102 may generate a user interface with which to provide data lineage metrics. For example, the dataset evaluation device 102 may generate a user interface identifying an overall data lineage quality metric or a set of overall data lineage metric types (e.g., an overall lineage automation metric, completeness metric, frequency metric, or accuracy metric). Additionally, or alternatively, the dataset evaluation device 102 may generate a user interface identifying data lineage metrics with different granularities. For example, the dataset evaluation device 102 may generate a metric identifying a data lineage accuracy for processes of the data lineage, datasets of the data lineage, or individual hops of the data lineage. For example, the dataset evaluation device 102 may characterize process lineage accuracy as strong, dataset lineage accuracy as moderate, and individual hop accuracy as insufficient.

Figure 1D:
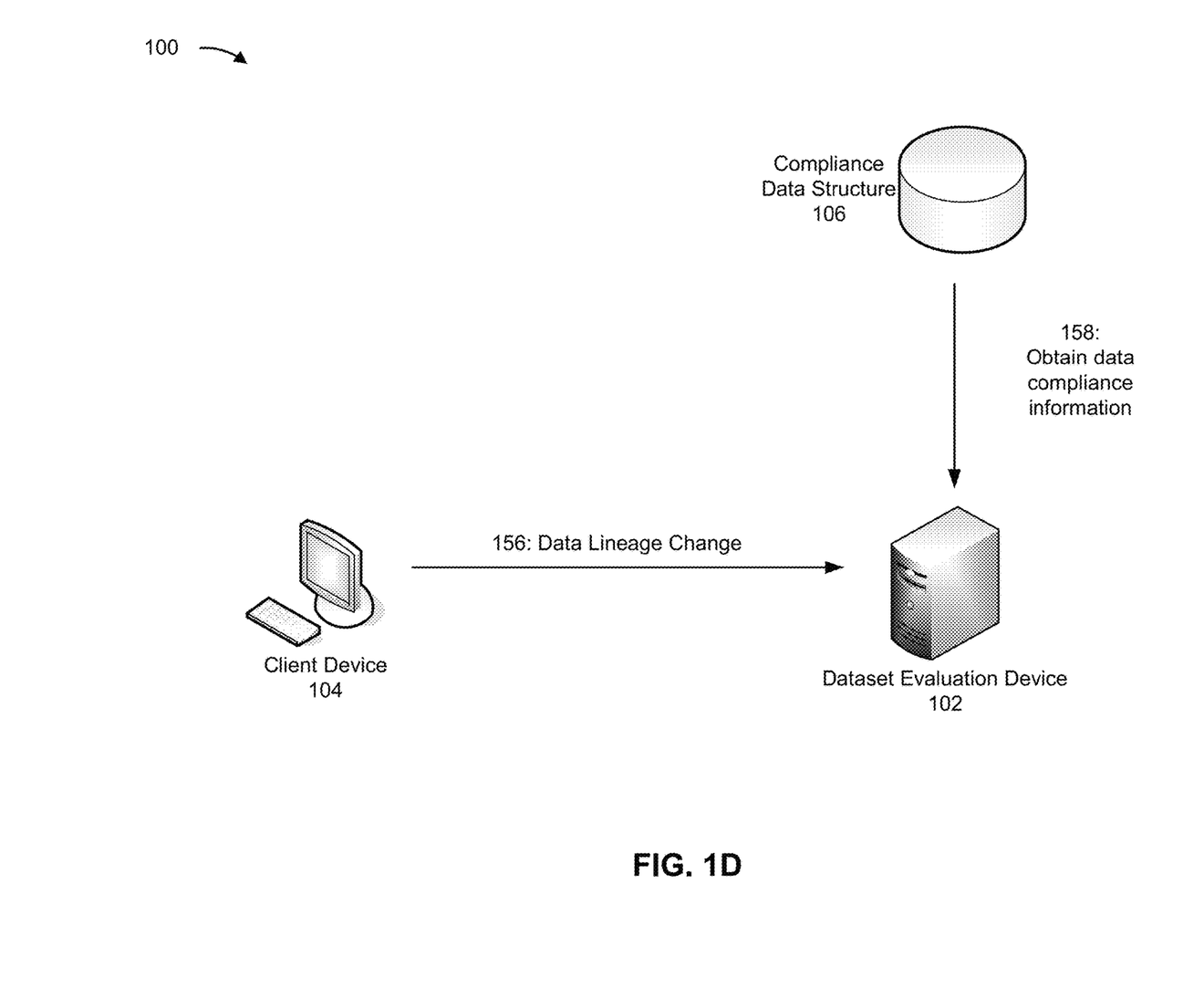

As shown in FIG. 1D, and by reference number 156, the dataset evaluation device 102 may receive information identifying a data lineage change or other event. For example, the dataset evaluation device 102 may receive information identifying a new process, dataset, or hop of the data lineage. Additionally, or alternatively, the dataset evaluation device 102 may receive information identifying a new compliance rule associated with the data lineage. Additionally, or alternatively, the dataset evaluation device 102 may receive information identifying a change to an existing dataset or hop of the data lineage.

As further shown in FIG. 1D, and by reference number 158, the dataset evaluation device 102 may obtain data compliance information. For example, the dataset evaluation device 102 may obtain information identifying one or more types of compliance rules. In this case, the one or more types of compliance rules may include privacy rules, risk management rules, data anonymization rules, or another type of rule.

Figure 1E:
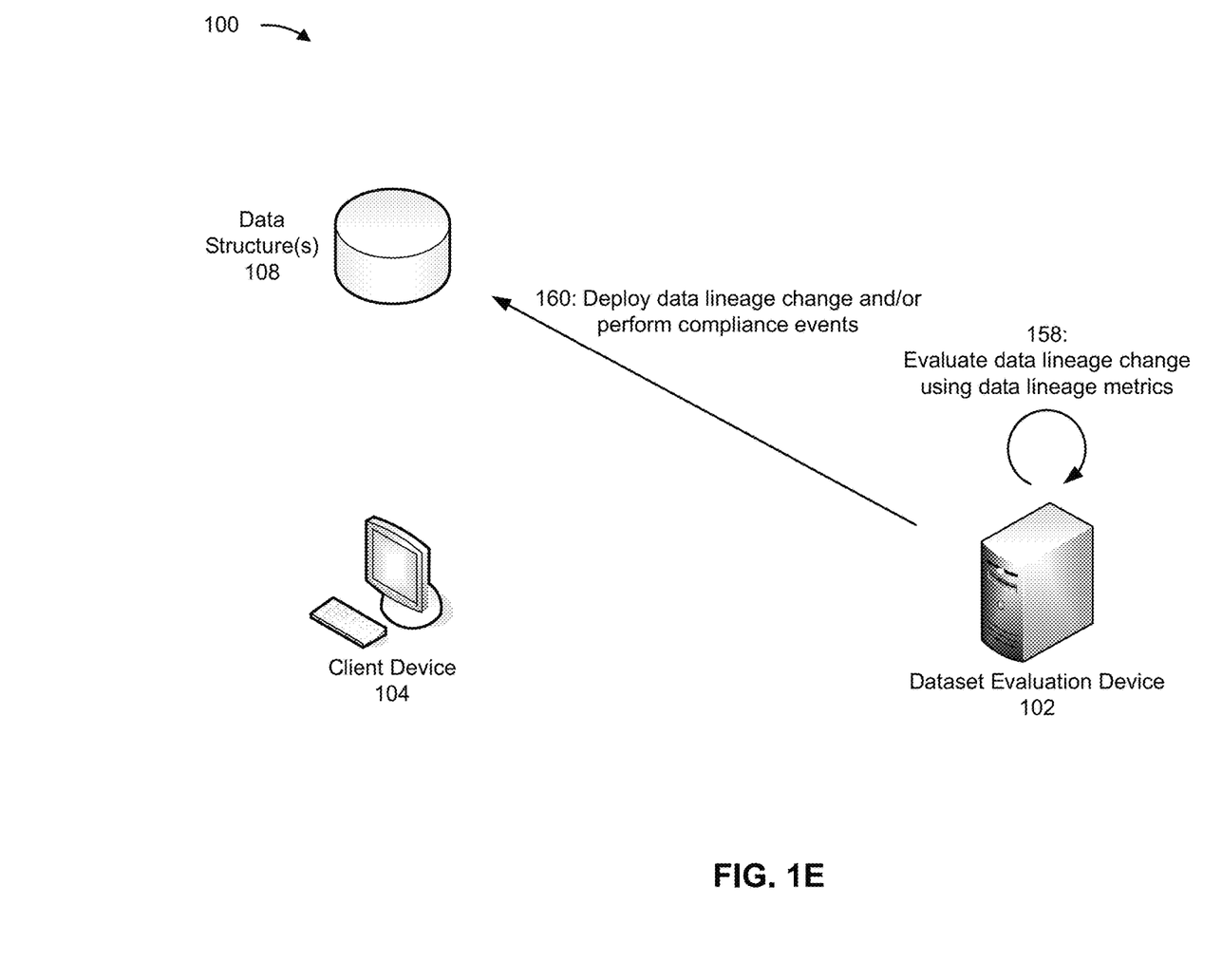

As shown in FIG. 1E, and by reference number 158, the dataset evaluation device 102 may evaluate the data lineage change using the one or more data lineage metrics. For example, the dataset evaluation device 102 may determine whether to perform an action corresponding to the data lineage change or an event associated therewith based on the one or more data lineage metrics. In some implementations, the data lineage change may relate to assessing a downstream data impact, ensuring data quality (e.g., performing data error detecting or replaying a specific data flow), maintaining compliance (e.g., satisfying a privacy rule, a usage rule, a responsibility rule), or supporting data governance (e.g., performing a privacy assessment or generating a resource optimization for computing resources that comprise a data infrastructure). For example, the dataset evaluation device 102 may evaluate whether to alter an allocation of computing resources to maintain datasets based on the data lineage change.

In some implementations, the dataset evaluation device 102 may determine to perform an action when a data lineage metric is less than a threshold and to forgo performing the action when the data lineage metric is greater than or equal to the threshold. Additionally, or alternatively, the dataset evaluation device 102 may select an action from a group of possible actions based on the overall data lineage metric. For example, the dataset evaluation device 102 may select a first action or transmit a first alert when the overall data lineage metric is in a first range of values (e.g., a first class) and may select a second action or transmit a second alert when the overall data lineage metric is in a second range of values (e.g., a second class). In this case, the dataset evaluation device 102 may provide output identifying a class or range of values to which the overall data lineage metric (or a component data lineage metric thereof) is assigned, such as a class indicating insufficient data lineage, moderate data lineage, strong data lineage, or very strong data lineage.

In some implementations, the dataset evaluation device 102 may use a machine learning model to select a processing action to perform as a response to a data lineage change or an event. For example, the dataset evaluation device 102 may use the machine learning model with the data lineage change or event and the overall data lineage metric as inputs to select a recommendation of a processing action from a group of possible processing actions. In this case, the dataset evaluation device 102 may use a machine learning model that implements a decision tree algorithm (e.g., to select an action), a clustering algorithm (e.g., to select a cluster for the data lineage and select an action corresponding to the cluster), or another type of algorithm for the machine learning model.

In some implementations, the dataset evaluation device 102 may perform a compliance action as the processing action. For example, the dataset evaluation device 102 may delete one or more datasets from the data lineage based on the overall data lineage metric and based on a compliance rule. In this case, the dataset evaluation device 102 may recalculate the overall data lineage metric based on deleting the one or more datasets from the data lineage and may perform one or more further processing actions or compliance actions based on a result of recalculating the overall data lineage metric. Based on recalculating the overall data lineage metric and determining a new overall data lineage metric, the dataset evaluation device 102 may transmit a new output, such as a new alert, or perform a new processing action.

In some implementations, the dataset evaluation device 102 may anonymize one or more datasets. For example, based on the overall data lineage metric and a compliance rule, the dataset evaluation device 102 may apply one or more anonymization techniques to the one or more datasets. Additionally, or alternatively, the dataset evaluation device 102 may transmit one or more alerts associated with the overall data lineage metric. For example, the dataset evaluation device 102 may transmit an alert updating a user interface to indicate the overall data lineage metric and/or a change thereto. Additionally, or alternatively, when the dataset evaluation device 102 determines that a determined overall data lineage metric differs from a previous overall data lineage metric by a threshold amount, the dataset evaluation device 102 may transmit an alert. In this case, the alert may indicate, for example, a security issue associated with a change to the data lineage, such as a security risk associated with a dataset. Additionally, or alternatively, the alert may indicate a recommendation for increasing the overall data lineage metric, such as a recommendation to alter a configuration of a set of hops by switching from processing of a hop occurring on an external system to occurring on an internal system. Additionally, or alternatively, the alert may indicate information about the data lineage. For example, the alert may include information identifying one or more missing hops (e.g., where a state of a dataset is not known in the data lineage) that negatively affect the overall data lineage metric.

In some implementations, the dataset evaluation device 102 may determine a new data lineage metric based on performing a processing action. For example, the dataset evaluation device 102 may perform a first processing action corresponding to an event and a first data lineage metric determined before performing the first processing action. In this case, the dataset evaluation device 102 may determine a second data lineage metric after performing the first processing action and may determine whether to perform a second processing action. Additionally, or alternatively, the dataset evaluation device 102 may predict the second data lineage metric before performing the first processing action. For example, the dataset evaluation device 102 may simulate a result of performing the first processing action and determine the second data lineage metric based on the simulated result. In this case, the dataset evaluation device 102 may approve performing the first processing action based on the second data lineage metric being predicted to satisfy a threshold.

In other words, the dataset evaluation device 102 may allow an event to occur and perform an associated processing action when the dataset evaluation device 102 determines that allowing the event and processing action to occur does not negatively impact an overall data lineage metric. Alternatively, when the second data lineage metric is predicted not to satisfy the threshold, the dataset evaluation device 102 may reject the event and/or performance of the first processing action. Additionally, or alternatively, the dataset evaluation device 102 may identify a different processing action based on rejecting performance of the first processing action.

As further shown in FIG. 1E, and by reference number 160, the dataset evaluation device 102 may perform a processing action. For example, the dataset evaluation device 102 may deploy a data lineage change and/or perform one or more compliance events.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
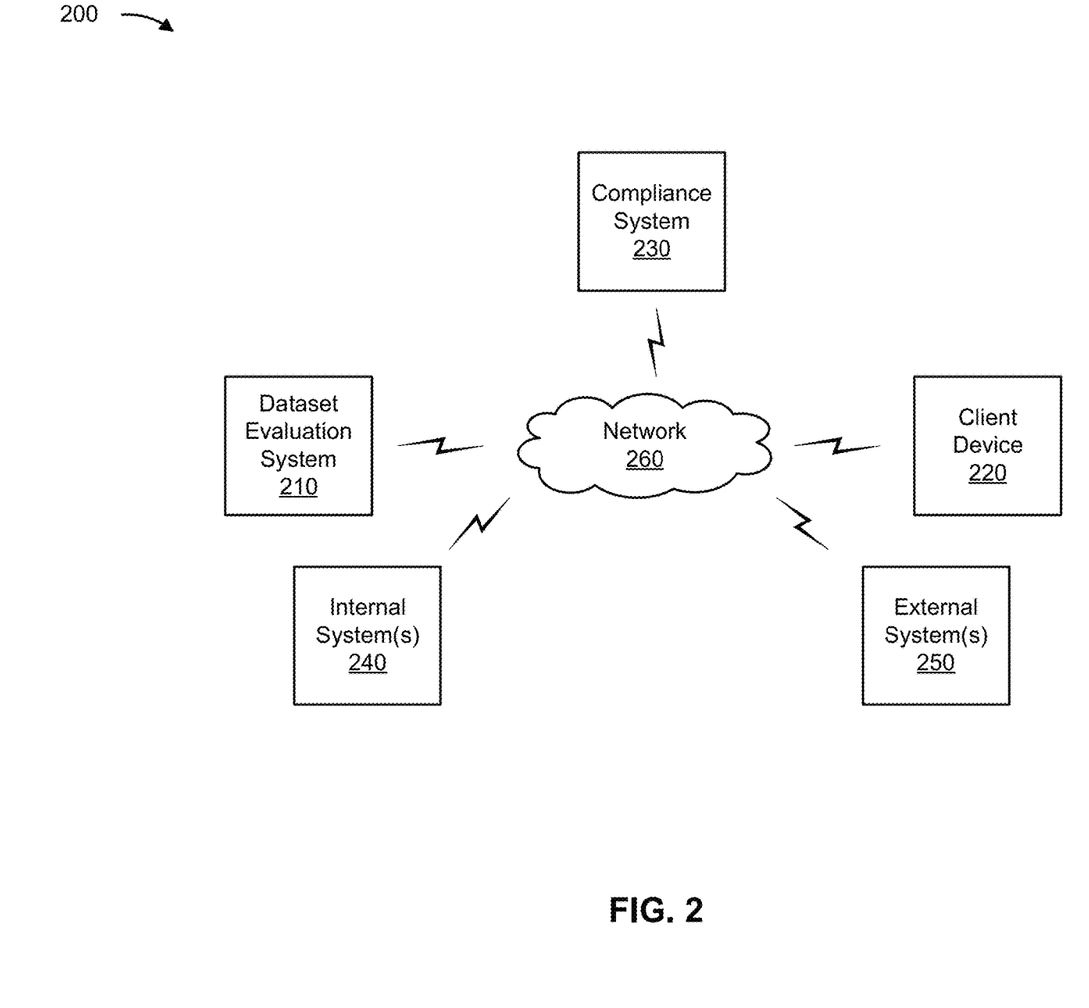
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a dataset evaluation system 210, a client device 220, a compliance system 230, one or more internal systems 240, one or more external systems 250, and a network 260. Devices of environment 200 may interconnect via wired connections, wireless connections, or a combination of wired and wireless connections.

The dataset evaluation system 210 may include one or more devices capable of receiving, generating, storing, processing, providing, and/or routing information associated with data lineage metric based data processing, as described elsewhere herein. In some implementations, the dataset evaluation system 210 may correspond to the dataset evaluation device 102 described with regard to FIGS. 1A-1E. The dataset evaluation system 210 may include a communication device and/or a computing device. For example, the dataset evaluation system 210 may include a server, such as an application server, a client server, a web server, a database server, a host server, a proxy server, a data lineage server, an enterprise server, a virtual server (e.g., executing on computing hardware), or a server in a cloud computing system. In some implementations, the dataset evaluation system 210 may include computing hardware used in a cloud computing environment.

The client device 220 may include one or more devices capable of receiving, generating, storing, processing, and/or providing information associated with data lineage metric based data processing, as described elsewhere herein. In some implementations, the client device 220 may correspond to the client device 104 described with regard to FIGS. 1A-1E. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The compliance system 230 may include one or more devices capable of receiving, generating, storing, processing, and/or providing information associated with data compliance, as described elsewhere herein. In some implementations, the compliance system 230 may correspond to the compliance data structure 106 described with regard to FIGS. 1A-1E. The compliance system 230 may include a communication device and/or a computing device. For example, the compliance system 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the compliance system 230 may store a set of compliance rules relating to data anonymization, data privacy, health privacy, or data tracking, as described elsewhere herein.

The internal system 240 may include one or more devices capable of receiving, generating, storing, processing, providing, and/or routing information associated with data processing, as described elsewhere herein. For example, the internal system 240 may be associated with performing one or more data transformations or processing procedures on a dataset. In some implementations, the internal system 240 may be internal to a particular entity. For example, the internal system 240 may operate on computing resources physically located at the particular entity or allocated to the particular entity. In some implementations, the internal system 240 may correspond to or include the data structure 108 described with regard to FIGS. 1A-1E. The internal system 240 may include a communication device and/or a computing device. For example, the internal system 240 may include a server, such as an application server, a client server, a web server, a database server, a host server, a proxy server, a virtual server (e.g., executing on computing hardware), or a server in a cloud computing system. In some implementations, the internal system 240 may include computing hardware used in a cloud computing environment.

The external system 250 may include one or more devices capable of receiving, generating, storing, processing, providing, and/or routing information associated with data processing, as described elsewhere herein. For example, the external system 250 may be associated with performing one or more data transformations or processing procedures on a dataset. In some implementations, the external system 250 may be external to a particular entity. For example, the external system 250 may operate on computing resources physically located offsite with respect to the particular entity or allocated to another entity. In some implementations, the external system 250 may correspond to or include the data structure 108 described with regard to FIGS. 1A-1E. The external system 250 may include a communication device and/or a computing device. For example, the external system 250 may include a server, such as an application server, a client server, a web server, a database server, a host server, a proxy server, a virtual server (e.g., executing on computing hardware), or a server in a cloud computing system. In some implementations, the external system 250 may include computing hardware used in a cloud computing environment.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
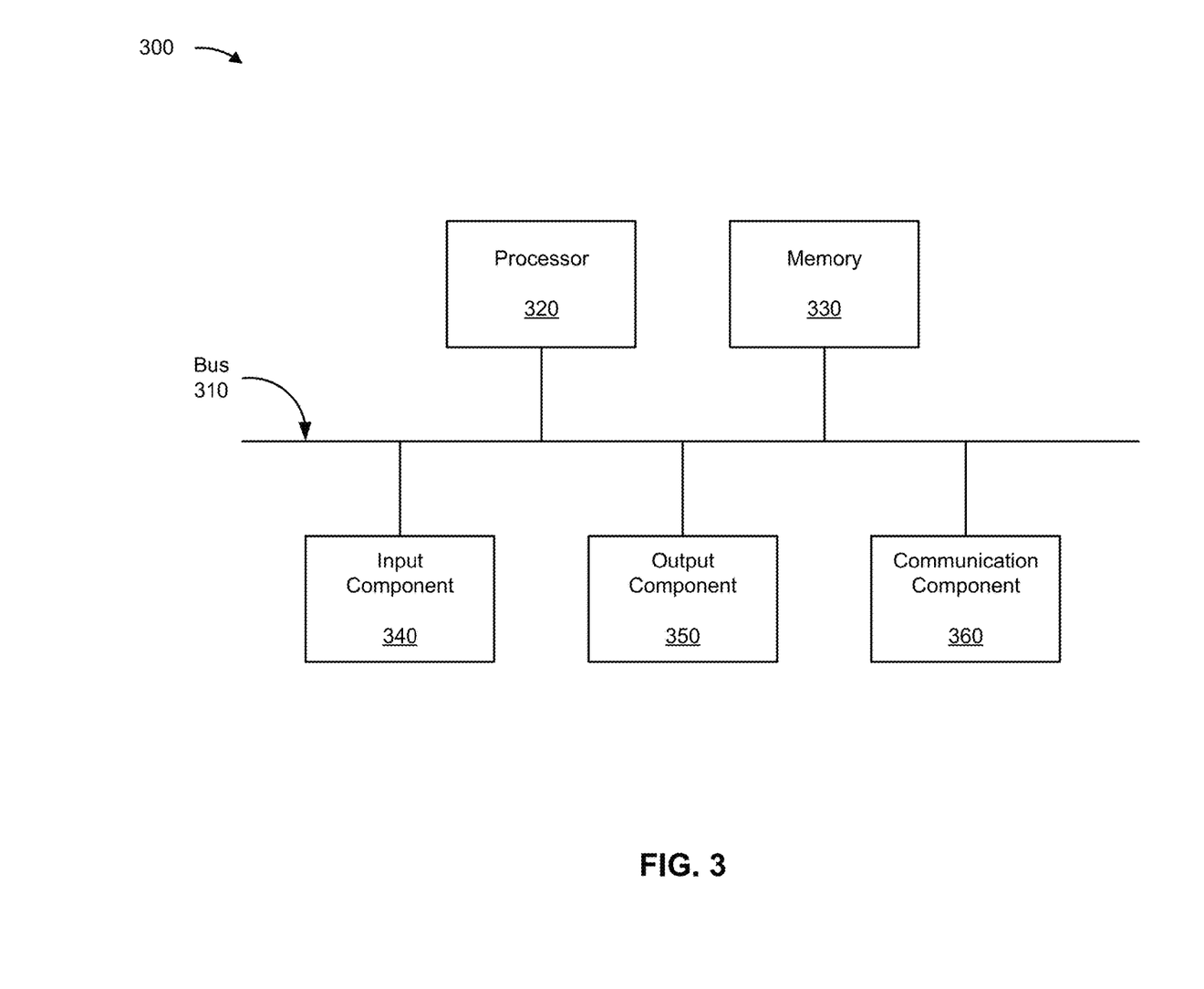
FIG. 3 is a diagram of example components of a device associated with data lineage metric based data processing, in accordance with some embodiments of the present disclosure.

FIG. 3 is a diagram of example components of a device 300 associated with data lineage metric based data processing. The device 300 may correspond to the dataset evaluation system 210, the client device 220, the compliance system 230, the one or more internal systems 240, and/or the one or more external systems 250. In some implementations, the dataset evaluation system 210, the client device 220, the compliance system 230, the one or more internal systems 240, and/or the one or more external systems 250 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
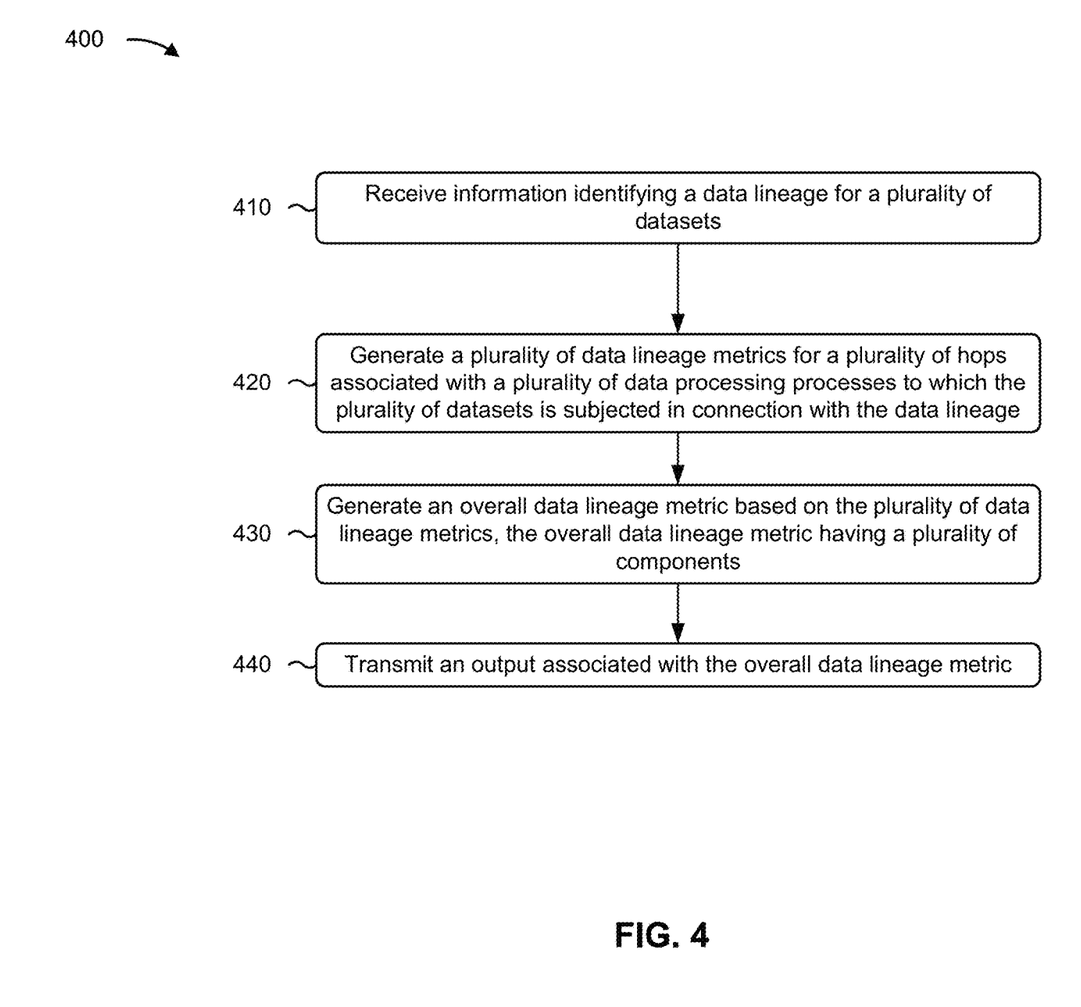
FIG. 4 is a flowchart of an example process associated with data lineage metric based data processing, in accordance with some embodiments of the present disclosure.

FIG. 4 is a flowchart of an example process 400 associated with data lineage metric based data processing. In some implementations, one or more process blocks of FIG. 4 may be performed by the dataset evaluation system 210. In some implementations, one or more process blocks of FIG. 4 may be performed by another device or a group of devices separate from or including the dataset evaluation system 210, such as the client device 220, the compliance system 230, the one or more internal systems 240, and/or the one or more external systems 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving information identifying a data lineage for a plurality of datasets (block 410). For example, the dataset evaluation system 210 (e.g., using processor 320, memory 330, input component 340, and/or communication component 360) may receive information identifying a data lineage for a plurality of datasets, as described above in connection with reference number 150 of FIG. 1A. As an example, the dataset evaluation system 210 may receive information identifying one or more datasets and one or more processes that are performed to transform or use the one or more datasets. In some implementations, the data lineage includes, for a dataset of the plurality of datasets, information identifying one or more hops associated with the dataset, each hop, of the one or more hops, corresponding to a transformation of the dataset in association with a data processing process.

As further shown in FIG. 4, process 400 may include generating a plurality of data lineage metrics for a plurality of hops associated with a plurality of data processing processes to which the plurality of datasets is subjected corresponding to the data lineage (block 420). For example, the dataset evaluation system 210 (e.g., using processor 320 and/or memory 330) may generate a plurality of data lineage metrics for a plurality of hops associated with a plurality of data processing processes to which the plurality of datasets is subjected corresponding to the data lineage, as described above in connection with reference number 152 of FIG. 1B. As an example, the dataset evaluation system 210 may determine attributes, such as a quantity of internal transformations applied by a process to a dataset, a data lineage type, or a process frequency, among other examples. Further to the example, the dataset evaluation system 210 may determine data lineage metric types using the attributes, such as determining data lineage accuracy metrics, resolution metrics, frequency metrics, or completeness metrics, among other examples.

An accuracy metric may include a metric relating to interactions (e.g., when evaluated at run-time) or interactions that will occur between a process and inputs and outputs of the process (e.g., when evaluated at design-time). For example, the dataset evaluation device 102 may determine an extent to which the data lineage accurately reflects the flow of datasets for which the data lineage has been created. Examples of accuracy metrics may include individual process quality metrics, overall process quality metrics, or overall dataset lineage quality metrics. The resolution metric may include a metric relating to whether the data lineage includes a sufficient level of detail to enable a particular use case. For example, a configured compliance use case may govern data at a per-dataset level or a per-data-entry level and the resolution metric may relate to whether the data lineage captures the data at a level associated with the configured compliance use case. Examples of resolution metrics may include granularity metrics (e.g., whether dataset level data lineage or attribute level data lineage is available), a percentage of attribute level details included in the data lineage, or a percentage of dataset level details included in the data lineage, among other examples.

A completeness metric may include a metric relating to whether the data lineage covers an entire data journey from a data source to a data destination, including transformations and intermediate steps for data. Examples of completeness metrics may include lineage types that are supported, percentages of boundary datasets that are covered by the data lineage, or a percentage of internal transformations that are covered by the data lineage. A frequency metric may include a metric relating to how often the data lineage is updated to reflect changes to hops and associated datasets. Examples of frequency metrics may include an individual process frequency, an overall process frequency, or an overall dataset lineage frequency, among other examples. Other examples of data lineage metrics may include usability metrics (e.g., indicating an ease of accessibility of data lineage information, which may be assessed by qualitative interviews or accessibility option enumeration), integration metrics (e.g., indicating whether the data lineage successfully integrates with systems, tools, or processes of a system, which may be assessed by a quantity of integrations used, a percentage of systems or tools integrated to the data lineage, or a percentage of processes that the data lineage is integrated with), or automation metrics (e.g., whether the dataset evaluation device 102 is configured to automatically update and maintain the data lineage without manual intervention through, for example, the use of machine learning or artificial intelligence).

As further shown in FIG. 4, process 400 may include generating an overall data lineage metric based on the plurality of data lineage metrics, the overall data lineage metric having a plurality of components (block 430). For example, the dataset evaluation system 210 (e.g., using processor 320 and/or memory 330) may generate an overall data lineage metric based on the plurality of data lineage metrics, the overall data lineage metric having a plurality of components, as described above in connection with reference number 154 of FIG. 1C. As an example, the dataset evaluation system 210 may generate a single overall metric for data lineage quality based on the plurality of component data lineage metrics. For example, as shown by reference number 154 of FIG. 1C, a data lineage may have a moderate overall data lineage quality, an insufficient lineage automation metric, a moderate lineage completeness metric, a moderate lineage frequency metric, or a strong lineage accuracy metric. Additionally, or alternatively, for the strong lineage accuracy metric, the data lineage may have a strong level of process lineage accuracy, a moderate level of dataset lineage accuracy, and an insufficient level of individual hop accuracy.

As further shown in FIG. 4, process 400 may include transmitting an output associated with the overall data lineage metric (block 440). For example, the dataset evaluation system 210 (e.g., using processor 320, memory 330, and/or communication component 360) may transmit an output associated with the overall data lineage metric, as described above in connection with reference number 160 of FIG. 1E. As an example, the dataset evaluation system 210 may alter a configuration of the data lineage based on the overall data lineage metric. Additionally, or alternatively, the dataset evaluation system 210 may perform a compliance action based on the overall data lineage metric.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for data processing, the system comprising:
one or more memories; and
one or more processors, communicatively coupled to the one or more memories, configured to:
receive information identifying a data lineage for a plurality of datasets,
the data lineage including, for a dataset of the plurality of datasets, information associated with one or more hops associated with the dataset;
evaluate the dataset to determine a hop based on one or more hop characteristics,
each hop, of the one or more hops, corresponding to a transformation of the dataset corresponding to a data processing process, and
a first hop, of the one or more hops, corresponding to a first transformation of a first dataset and a first output from the first data processing process;
generate a plurality of data lineage metrics for a plurality of hops associated with a plurality of data processing processes to which the plurality of datasets is subjected in association with the data lineage;
generate an overall data lineage metric based on the plurality of data lineage metrics, the overall data lineage metric having a plurality of components;
wherein the plurality of components are related to data lineage accuracy for processes of the data lineage, datasets of the data lineage and individual hops of the data lineage;
receive information identifying an event associated with the data lineage; and
perform a processing action based on the event and the overall data lineage metric.

2. The system of claim 1, wherein the one or more processors are further configured to:
determine a new overall data lineage metric corresponding to the event associated with the data lineage; and
determine that the new overall data lineage metric satisfies a threshold; and
wherein the one or more processors, to perform the processing action, are configured to:
approve the event based on determining that the new overall data lineage metric satisfies the threshold.

3. The system of claim 1, wherein the one or more processors are further configured to:
determine a new overall data lineage metric corresponding to the event associated with the data lineage; and
determine that the new overall data lineage metric does not satisfy a threshold; and
wherein the one or more processors, to perform the processing action, are configured to:
reject the event based on determining that the new overall data lineage metric does not satisfy the threshold.

4. The system of claim 1, wherein the one or more processors are further configured to:
identify a compliance rule associated with the event; and wherein the one or more processors, to perform the
processing action, are configured to:
perform the processing action to satisfy the compliance
rule.

5. The system of claim 1, wherein the one or more processors, to perform the processing action, are configured to:
delete one or more datasets from the plurality of datasets.

6. The system of claim 1, wherein the one or more processors, to perform the processing action, are configured to:
anonymize one or more datasets from the plurality of datasets.

7. The system of claim 1, wherein the one or more processors are further configured to:
transmit information identifying the overall data lineage metric for display via a user interface.

8. A method, comprising:
receiving, by device, information identifying a data lineage for a plurality of datasets, the data lineage including, for a dataset of the plurality of datasets, information associated with one or more hops associated with the dataset;
evaluate the dataset to determine a hop based on one or more hop characteristics,
each hop, of the one or more hops, corresponding to a transformation of the dataset corresponding to a data processing process, and
a first hop, of the one or more hops, corresponding to a first transformation of a first dataset and a first output from the first data processing process;
generating, by the device, a plurality of data lineage metrics for a plurality of hops associated with a plurality of data processing processes to which the plurality of datasets is subjected in association with the data lineage;
generating, by the device, an overall data lineage metric based on the plurality of data lineage metrics, the overall data lineage metric having a plurality of components,
wherein the plurality of components are related to data lineage accuracy for processes of the data lineage, datasets of the data lineage and individual hops of the data lineage; and
transmitting, by the device, an output associated with the overall data lineage metric.

9. The method of claim 8, wherein the plurality of components includes at least one of:
an accuracy component metric,
a resolution component metric,
a frequency component metric, or
a completeness component metric.

10. The method of claim 8, further comprising:
receiving program code;
parsing the program code to determine one or more inputs of the program code and one or more outputs of the program code; and
correlating the plurality of datasets to the one or more inputs of the program code and the one or more outputs of the program code; and
wherein identifying the one or more hops comprises:
identifying the one or more hops based on correlating the plurality of datasets to the one or more inputs of the program code and the one or more outputs of the program code.

11. The method of claim 8, further comprising:
receiving information identifying a new dataset associated with the data lineage;
determining a new overall data lineage metric based on a new one or more hops associated with the new dataset; and
transmitting a new output associated with the new overall data lineage metric.

12. The method of claim 11, further comprising:
determining that the new overall data lineage metric differs from the overall data lineage metric by a threshold amount; and
wherein transmitting the new output comprises:
transmitting an alert identifying the new dataset and indicating that the new overall data lineage metric differs from the overall data lineage metric by the threshold amount.

13. The method of claim 8, further comprising:
receiving information identifying a new data processing process associated with the data lineage;
determining a new overall data lineage metric based on a new one or more datasets associated with the new data processing process; and
transmitting a new output associated with the new overall data lineage metric.

14. The method of claim 13, further comprising:
determining that the new overall data lineage metric differs from the overall data lineage metric by a threshold amount; and
wherein transmitting the new output comprises:
transmitting an alert identifying the new data processing process and indicating that the new overall data lineage metric differs from the overall data lineage metric by the threshold amount.

15. The method of claim 8, further comprising:
generating a user interface with which to display the output.

16. A non-transitory computer-readable medium storing a set of instructions, the set of instructions comprising:
one or more instructions that, when executed by one or more processors of a system, cause the system to:
receive information identifying a data lineage for a plurality of datasets,
the data lineage including, for a dataset of the plurality of datasets, information associated with one or more hops associated with the dataset;
evaluate the dataset to determine a hop based on one or more hop characteristics,
each hop, of the one or more hops, corresponding to a transformation of the dataset corresponding to a data processing process, and
a first hop, of the one or more hops, corresponding to a first transformation of a first dataset and a first output from the first data processing process;
generate a plurality of data lineage metrics for a plurality of hops associated with a plurality of data processing processes to which the plurality of datasets are subjected in association with the data lineage;
generate an overall data lineage metric based on the plurality of data lineage metrics, the overall data lineage metric having a plurality of components,
wherein the plurality of components are related to data lineage accuracy for processes of the data lineage, datasets of the data lineage and individual hops of the data lineage; and
transmit one or more alerts associated with the overall data lineage metric.

17. The non-transitory computer-readable medium of claim 16, wherein an alert, of the one or more alerts, classifies the overall data lineage metric into a class of a plurality of classes associated with a plurality of different ranges for the overall data lineage metric.

18. The non-transitory computer-readable medium of claim 16, wherein an alert, of the one or more alerts, indicates a compliance rule that is not satisfied by the data lineage corresponding to the overall data lineage metric.

19. The non-transitory computer-readable medium of claim 16, wherein an alert, of the one or more alerts, includes a recommendation for increasing the overall data lineage metric.

20. The non-transitory computer-readable medium of claim 16, wherein an alert, of the one or more alerts, includes information identifying one or more missing hops that affect the overall data lineage metric.

* * * * *